(12) United States Patent
Morihiro et al.

(10) Patent No.: US 7,176,258 B2
(45) Date of Patent: Feb. 13, 2007

(54) WATER-BASED EMULSION FOR VIBRATION DAMPER

(75) Inventors: Shigeyasu Morihiro, Osaka (JP); Yukihiro Miyawaki, Kobe (JP); Dai Nagaishi, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 10/951,213

(22) Filed: Sep. 27, 2004

(65) Prior Publication Data

US 2005/0101697 A1    May 12, 2005

(30) Foreign Application Priority Data

Sep. 30, 2003  (JP)  .............................. 2003-340359
Mar. 30, 2004  (JP)  .............................. 2004-099305

(51) Int. Cl.
*C08L 31/02*  (2006.01)

(52) U.S. Cl. ..................... 525/80; 525/197; 525/221; 525/222; 525/227

(58) Field of Classification Search ................ 524/458, 524/475, 80, 197, 221, 222, 227
See application file for complete search history.

(56) References Cited

U.S. PATENT DOCUMENTS

| 4,199,486 | A |   | 4/1980 | Boessler et al. | ....... 260/31.8 M |
| 4,774,291 | A |   | 9/1988 | Maeda | ......................... 525/197 |
| 5,066,708 | A | * | 11/1991 | Koller et al. | ................. 524/504 |
| 5,349,025 | A | * | 9/1994 | Siol et al. | ..................... 525/309 |
| 6,710,112 | B1 |   | 3/2004 | Sandor et al. | .............. 524/458 |
| 2003/0125459 | A1 |   | 7/2003 | Wulff et al. | ................. 524/800 |

FOREIGN PATENT DOCUMENTS

| DE | 199 54 619 A1 | 5/2001 |
| DE | 101 64 183 A1 | 7/2003 |
| EP | 507634 | 10/1992 |
| EP | 0 698 644 A1 | 2/1996 |
| EP | 1 162 217 A1 | 12/2001 |
| EP | 1 408 089 A1 | 4/2004 |
| JP | S53-78234 | 7/1978 |
| JP | A-04-306273 | 4/1991 |
| JP | A-10-139973 | 11/1996 |
| JP | A-2002-284821 | 3/2001 |
| JP | 2001-152028 | 6/2001 |
| JP | A-2003-082037 | 9/2001 |

\* cited by examiner

*Primary Examiner*—Ling-Sui Choi
(74) *Attorney, Agent, or Firm*—Fish & Richardson P.C.

(57) ABSTRACT

A water-based emulsion for vibration damper is provided for the formation of an excellent vibration damper. In an aspect, the emulsion for vibration damper contains a particle including a core part formed of an acrylic copolymer (A) and a shell part formed of an acrylic copolymer (B) which covers the core part, the glass transition point of the acrylic copolymer (B) being not lower than −9° C., and the difference between the glass transition point of the acrylic copolymer (B) and the glass transition point of the acrylic copolymer (A) being not less than 20° C.

23 Claims, No Drawings

WATER-BASED EMULSION FOR VIBRATION DAMPER

BACKGROUND OF THE INVENTION

1. Field of the Invention

The present invention relates to an emulsion to be used for forming a vibration damper. The emulsion of the present invention is applied to a member such as the chassis of a vehicle which is expected to manifest a vibration damping property.

2. Description of Related Art

For the purpose of keeping a place prone to transmission of vibration in quiescence, a vibration damper which absorbs the energy of sound is utilized. By the vibration damper which is disposed as on the chassis of an automobile, for example, the vibration transmitted from the road surface and the engine is reduced and the environment inside the cabin is consequently improved.

As the material to be used for vibration damper, the rubber-based latex and the acrylic copolymer have been proposed. In equipment such as the vehicle which is used at temperature varied in a wide range from below the freezing point to several tens of degrees centigrade, the function of the vibration damper is required to be manifested in the broad temperature range. As a conventional technique for complying with this requirement, the emulsion for vibration damper which contains a core-shell type particle having a core part formed of an acrylic copolymer and a shell part formed of an acryl copolymer, which covers the core part, has been proposed (refer to JP-A-S53-78234 and EP 507634, for example). The core-shell type particles possess an excellent vibration damping property in a wide range of temperature as compared with an emulsion using acryl copolymer alone or an emulsion using two or more species of acryl copolymer as blended.

In the formation of a vibration damper by the use of an emulsion containing polymer particles, however, the thermally drying property of the coating film has posed a problem.

In order for the coating film to function as a vibration damper, it is required to have a fixed thickness. When the coating film of a large thickness is to be dried, however, since the drying of this coating film tends to proceed from the surface inwardly, the part of the coating film near the surface is hardened while the inner part of the coating film is still retaining moisture. This trend is particularly conspicuous when the coating film is formed by using an emulsion because the coating film formed of the emulsion, when the amount of water surrounding the particles decreases, is immediately fused and allowed to form the film.

When the water in the coating film is vaporized after the part of the coating film near the surface has been hardened, the problem that the already hardened part of the coating film near the surface inflates toward the outside of the coating film and the problem that the coating film sustains a crack can occur. When the coating film inflates or sustains a crack, the vibration damper will suffer the characteristic property thereof to be greatly degraded. This drawback will eventually prevent any improvement attained in such core-shell type particles which are contained in the emulsion from manifesting its characteristics fully satisfactorily.

As another conventional means for enabling the vibration damping property to be manifested in abroad temperature range, the method of mixing two or more kinds of polymers having different glass transition points has been proposed. For example, a mixture of aqueous dispersions of two or more kinds of polymers of different glass transition points, namely a polymer of a low glass transition point and a polymer of a high glass transition point, specifically a mixture in which the polymer of a low glass transition point has a glass transition point in the range of −20–10° C. and the polymer of a high glass transition point has a glass transition point in the range of 20–50° C., the difference between the glass transition points of the two polymers falls in the range of 30–50° C., and a compatibilizing agent is incorporated, has been proposed as a water-based emulsion for vibration damper (JP-A-2001-152028).

The water-based emulsion of this construction for vibration damper realizes the broadening of the temperature peak of the vibration damping property thereof by using the mixture of the aqueous dispersions of mutually incompatible polymers and further, in view of the incompatibility of the polymers, by further incorporating in the mixture a solvent and/or a cohesiveness imparting resin which possesses the quality of gradually volatilizing at room temperature as a compatibilizing agent in an amount of 1–70 parts by weight based on 100 parts by weight of the polymer component.

Since the emulsion essentially contains the compatibilizing agent, however, it entails the problem that the compatibilizing agent will persist in the coating film and degrade the vibration damping property of the emulsion.

BRIEF SUMMARY OF THE INVENTION

It is an object of the present invention to provide a novel emulsion for vibration damper and enhance the property of the coating film formed as a vibration damper.

It is an object of the present invention to provide a means to improve the drying property of a coating film formed as a vibration damper and repress the occurrence of crack or inflation in the surface of the coating film.

In the first aspect of the invention, a water-based emulsion for vibration damper includes a particle comprising a core part formed of an acrylic copolymer (A) and a shell part formed of an acrylic copolymer (B) which covers the core part, the glass transition point of the acrylic copolymer (B) is not lower than −9° C., and the difference between the glass transition point of the acrylic copolymer (B) and the glass transition point of the acrylic copolymer (A) is not less than 20° C.

The coating film which is formed by using the water-based emulsion for vibration damper of the first aspect excels in drying property and avoids sustaining a crack or inflation during the drying process. Thus, it fully utilizes the effect possessed by the core-shell type particles and permits formation of a vibration damper which is usable in a wide range of temperature.

It is an object of the present invention to provide an emulsion for vibration damper which possesses a high vibration damping property particularly in a wide range of temperature.

In the second aspect of the invention, a water-based emulsion for vibration damper includes a particle formed of an acrylic copolymer (C) having a weight average molecular weight in the range of 20,000 to 250,000 and a glass transition point in the range of −30 to 0° C., and a particle formed of an acrylic copolymer (D) having a weight average molecular weight in the range of 20,000 to 250,000 and a glass transition point in the range of 5 to 50° C., the ratio of the particle formed of the acrylic copolymer (C) is in the range of 50 to 70 mass % based on the solid component contained in the emulsion, and the ratio of the particles of the acrylic copolymer (D) is in the range of 50 to 30 mass % based on the solid component contained in the emulsion.

The water-based emulsion for vibration damper of the second aspect includes particles of two or more kinds of acrylic copolymers having weight average molecular weights in the range of 20,000 to 250,000 and mutually different glass transition points as described above. Because both of copolymers used are acrylic polymer, these two types of particles have mutually satisfactory compatibility. Thus, the emulsion requires no incorporation of compatibilizing agent and resolves the problem arising from the incorporation of compatibilizing agent. Moreover, the film formed by using the water-based emulsion for vibration damper of the present invention possesses a high vibration damping property particularly in a wide range of temperature.

DETAILED DESCRIPTION OF THE INVENTION

For a start, the first aspect of the present invention will be described. The inventors have found that the drying property of a coating film is enhanced by controlling the glass transition point (hereinafter described as "Tg") of a core-shell type particle incorporated in a water-based emulsion for vibration damper.

The vibration damping emulsion of the present invention contains therein core-shall type particles having different magnitudes of Tg. These particles have a difference of not less than 20° C. between the Tg of the acrylic copolymer (B) forming the shell part and the Tg of the acrylic copolymer (A) forming the core part. The range of the Tg of the acrylic copolymer (B) forming the core part satisfies a specific condition. When the Tg of the acrylic copolymer (A) forming the core part and the Tg of the acrylic copolymer (B) forming the shell part satisfy the conditions specified by the present invention, the hardening of the surface of the coating film during the course of drying can be repressed, though the mechanism responsible for this phenomenon has not been definitely elucidated. Thus, the surface of the coating film is prevented from sustaining such drawbacks as inflation and crack which tend to occur when the moisture in the coating film is evaporated through the surface of the coating film.

When a particle having the low Tg part and the high Tg part therein are interfused during the course of thermal drying, a Tg gradient is formed in the particle. As a result, a coating film to be obtained combines high strength and plasticity and represses the possibility of a crack and the decrease of the adhesive property.

The components of the emulsion for vibration damping of the first aspect will be described.

The emulsion of the present invention at least includes a medium and a core-shell type particle dispersed in the medium.

As the medium, a water-based medium is typically used. As concrete examples of the water-based medium, water and a mixed solution formed by mixing water and a solvent miscible with water may be cited. In consideration of the safety and the influence to the environment during the application of a coating medium containing the emulsion, the water-based medium is preferred to be water.

The core-shell type particle is a particle which possesses a core part formed of an acrylic copolymer (A) and a shell part formed of an acrylic copolymer (B), and the acrylic copolymer (B) covers the core part.

The term "acrylic copolymer" means a copolymer formed of two or more monomer units, at least one of which originates in acrylic acid, methacrylic acid, a salt thereof, or an ester thereof. That is, this term refers to a copolymer in which at least one of the monomer units thereof originates in a monomer represented by $CH_2=CH-COOR'$ or $CH_2=C(CH_3)-COOR''$. In the formulas, R' and R'' denote a hydrogen atom, an alkali metal atom, or a linear, branched, or cyclic alkyl group. The other monomer unit is selected from the compounds which are copolymerizable with these compounds.

The Tg of the acrylic copolymer (A) forming the core part is 20° C. or more lower or 20° C. or higher than the Tg of the acrylic copolymer (B) forming the shell part. By imparting this difference of Tg between the acrylic copolymer (A) and the acrylic copolymer (B), the emulsion is enabled to manifest a high vibration damping property in a wide range of temperature.

The monomer unit which forms the acrylic copolymer (A) is not particularly restricted so long as the acrylic copolymer (A) has a Tg falling in the range specified by the present invention and is usable for vibration damper.

The following compounds are usable as the monomer to be used for the synthesis of the acrylic copolymer (A). However, the monomer as a raw material of the acrylic copolymer (A) is not restricted to the following compounds.

Acrylic acid, methacrylic acid, crotonic acid, citraconic acid, itaconic acid, maleic acid, maleic anhydride, fumaric acid, methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, pentyl acrylate, pentyl methacrylate, isoamyl acrylate, isoamyl methacrylate, hexyl acrylate, hexyl methacrylate, cyclohexyl acrylate, cyclohexyl methacrylate, octyl acrylate, octyl methacrylate, isooctyl acrylate, isooctyl methacrylate, nonyl acrylate, nonyl methacrylate, isononyl acrylate, isononyl methacrylate, decyl acrylate, decyl methacrylate, dodecyl acrylate, dodecyl methacrylate, dodecyl methacrylate, tridecyl acrylate, tridecyl methacrylate, hexadecyl acrylate, hexadecyl methacrylate, octadecyl acrylate, octadecyl methacrylate, 2-ethylhexyl acrylate, 2-ethylhexyl methacrylate, styrene, α-methyl styrene, vinyl toluene, ethylvinyl benzene, acrylonitrile, methacrylonitrile, vinyl formate, vinyl acetate, vinyl propionate, acrylamide, methacrylamide, diacetone acrylamide, N-methylol acylamide, N-methylol methacrylamide, 2-hydroxyethyl acrylate, 2-hydroxyethyl methacrylate, 2-hydroxypropyl acrylate, 2-hydroxypropyl methacrylate, divinyl benzene, diallyl phthalate, triallyl cyanurate, ethylene glycol diacrylate, ethylene glycol dimethacrylate, 1,4-butane diol diacrylate, 1,4-butane diol dimethacrylate, 1,6-hexane diol diacrylate, 1,6-hexane diol dimethacrylate, diethylene glycol diacrylate, diethylene glycol dimethacrylate, allyl acrylate, and allyl methacrylate.

The content of the monomers which form the acrylic copolymer (A) are not particularly restricted. Generally, the monomer units originating in acrylic acid, methacrylic acid, salts thereof, or esters thereof are contained in an amount in the range of 30 to 60 mass %, based on the total of the monomer units. The mass % used herein means the average of the particles contained in the relevant emulsion.

The Tg of the acrylic copolymer to be synthesized may be decided on the basis of the knowledge already acquired or may be controlled by the kinds of monomer units and the ratios of use thereof. The Tg of the acrylic copolymer to be synthesized can be theoretically calculated by the following formula.

$$\frac{1}{Tg'} = \left(\frac{W_1'}{T_1} + \frac{W_2'}{T_2} + \ldots + \frac{W_n'}{T_n}\right)$$

In the formula, Tg' denotes the Tg (absolute temperature) of the acrylic copolymer to be synthesized, $W_1'$, $W_2'$, ... $W_n'$ denote the mass ratio of each monomer based on the total weight of all the monomers, and $T_1$, $T_2$, ... $T_n$ denote the glass transition points (absolute temperature) of the homopolymer formed of each monomer.

The Tg of the acrylic copolymer (B) forming the shell part is not lower than −9° C. When the Tg of the acrylic copolymer (B) forming the shell part satisfies this condition, the coating film formed of a coating medium including the emulsion for vibration damper of the present invention acquires a good drying property and represses the possibility of the surface inflation or a crack. That is, the emulsion results in the production of a vibration damper that possesses an excellent vibration damping property. Specifically, the Tg of the acrylic copolymer (B) forming the shell part is preferably in the range of −9 to 70° C. and more preferably −9 to 50° C. The Tg of the acrylic copolymer (A) forming the core part is designed to differ from the Tg of the acrylic copolymer (B) forming the shell part by 20° C. or more.

The difference between the Tg of the acrylic copolymer (B) forming the shell part and the Tg of the acrylic copolymer (A) forming the core part is not less than 20° C. By imparting this difference between the Tg of the acrylic copolymer (A) forming the core part and the Tg of the acrylic copolymer (B) forming the shell part, the vibration damper can comply with the requirement concerning a wide range of temperature. When this difference of temperature is unduly large, the overage may possibly result in degrading the vibration damping property at the temperature of actual use. In consideration of all these factors, the difference between the Tg of the acrylic copolymer (B) forming the shell part and the Tg of the acrylic copolymer (A) forming the core part is preferably in the range of 20 to 100° C., more preferably 20 to 90° C., and still more preferably 20–80° C.

The monomer unit which forms the acrylic copolymer (B) is not particularly restricted so long as the Tg of the acrylic copolymer (B) falls in the range specified by the present invention and is usable for vibration damper. As concrete examples of the monomer which is usable for the synthesis of the acrylic copolymer (B), the compounds enumerated above with respect to the acrylic copolymer (A) may be cited. However, the monomer as the raw material for the acrylic copolymer (B) is not limited to the compounds so enumerated.

The content of the component monomers which form the acrylic copolymer (B) is not particularly restricted. Generally, the monomer unit which originates in acrylic acid, methacrylic acid, a salt thereof, or an ester thereof is contained in an amount in the range of 40 to 70 mass % based on the total weight of all the monomer units.

The core-shell type particle possesses such a structure that the acrylic copolymer of the core part is covered with the acrylic copolymer of the shell part. While the surface of the core part is preferably covered completely with the shell part, it may not be covered completely in some situations. For example, the surface may be covered in a reticular form or it may be so covered that the core part is partly exposed.

In the core-shell type particle, the core part and the shell part may be distinctly separated or they may coexist in the boundary between the core part and the shell part. So long as at least the core part exists at the center of the particle and the shell part formed of an acrylic copolymer having a different Tg from the acrylic copolymer forming the core part exists in the particle, the particle deserves to be designated as a core-shell type particle. Optionally, an acrylic copolymer having a still different Tg may be formed on the outside of the shell part. The outer surface of the shell part, when necessary, may be given a surface treatment.

In the core-shell type particle, the core part formed of an acrylic copolymer and the shell part formed of an acrylic copolymer having a different Tg from the acrylic copolymer forming the core part are present. The mass ratio of the low Tg acrylic copolymer to the high Tg acrylic copolymer is preferably in the range of 1:9 to 5:5 and more preferably 3:7 to 5:5. If the proportion of the low Tg acrylic copolymer is unduly small, the shortage may possibly result in causing the coating film to sustain a crack after drying process. In contrast, if the content of the low Tg acrylic copolymer is unduly large, the overage may possibly result in causing the coating film to inflate after drying process.

Though the average particle diameter of the core-shell type particle is not particularly restricted, it is generally in the range of 10 nm to 1 μm and preferably 20 to 500 nm. If the average particle diameter of the emulsion falls short of 10 nm, the shortage may possibly result in causing the emulsion to acquire unduly high viscosity, fail to retain stability of dispersion, and yield to coagulation. Conversely, if it exceeds 1 μm, the overage may possibly prevent the emulsion from being emulsion.

Now, the method for the production of the emulsion for vibration damper will be described below.

The emulsion of the first aspect can be prepared by a known method of emulsion polymerization such as the seed method. The emulsion of the first aspect, for example, can be produced by a method which includes (1) a step of emulsion-polymerizing a monomer in a water-based medium in the presence of a surfactant and/or a protective colloid thereby forming a core part formed of an acrylic copolymer (A) and (2) a step of adding a monomer to the emulsion containing the core part and further emulsion-polymerizing the resultant mixture thereby forming a shell part formed of an acrylic copolymer (B).

As a means to add a monomer and a polymerization initiator, the monomer component dropwise addition method, the preemulsion method, the power feed method, and the multistage addition method are available besides the seed method.

The emulsifier is not particularly restricted. Various emulsifiers are usable herein. For example, anionic surfactants, nonionic surfactants, cationic surfactants, amphoteric surfactants, high polymer surfactants, and reactive surfactants thereof may be used as emulsifiers. These surfactants may be used in a combined form.

The anionic surfactant includes alkyl sulfates such as sodium dodecyl sulfate, potassium dodecyl sulfate, and ammonium alkyl sulfates; sodium dodecyl polyglycol ether sulfate; sodium sulforicinoate; alkyl sulfonates such as sulfonated paraffin salts; alkyl sulfonates such as sodium dodecylbenzene sulfonate, alkali metal sulfates of alkaliphenol hydroxyethylene; higher alkyl naphthalene sulfonates; naphthalene sulfonic acid formalin condensate; fatty acid salts such as sodium laurate, triethanol amine oleate, and triethanol amine abietate; polyoxyalkyl ether sulfuric acid ester salts; polyoxyethylene caraboxylic acid ester sulfate ester salts; polyoxyethylene phenyl ether sulfuric acid ester salts; succinic acid dialkyl ester sulfonic acid salts; and polyoxyethylenealkyl aryl sulfates, for example. The anionic surfactants are not limited thereto. The anionic surfactants may be used in the form of a mixture of two or more members.

The nonionic surfactant includes polyoxyethylene alkyl ether; polyoxyethylene alkyl aryl ether; sorbitan fatty acid esters; polyoxyethylene sorbitan aliphatic esters; aliphatic monoglycerides such as monolaurate of glycerol; polyoxyethylene oxypropylene copolymer; and condensates of ethylene oxide with aliphatic amine, amide, or acid, for example. The nonionic surfactants are not limited thereto. The nonionic surfactants may be used in the form of a mixture of two or more members.

The cationic surfactant includes dialkyl dimethyl ammonium salts, ester type dialkyl ammonium salts, amide type dialkyl ammonium salts, and dialkyl imidazolinium salts, for example. The cationic surfactants are not limited thereto. The cationic surfactants may be used in the form of a mixture of two or more members.

The amphoteric surfactant includes alkyl dimethylaminoacetic acid betaines, alkyldimethyl amine oxides, alkylcarboxymethyl hydroxyethyl imidazolinium betaines, alkylamideproplyl betaines, and alkyl hydroxysulfobetaines, for example. The amphoteric surfactants are not limited thereto. The amphoteric surfactants may be used in the form of a mixture of two or more members.

The high polymer surfactant includes polyvinyl alcohol and modifications thereof; (meth)acrylic acid type water-soluble polymers; hydroxyethyl(meth)acrylic acid type water-soluble polymers; hydroxypropyl(meth)acrylic acid type water-soluble polymers; and polyvinyl pyrrolidone, for example. The high polymer surfactants are not limited thereto. The high polymer surfactants may be used in the form of a mixture of two or more members.

Among emulsifiers, reactive emulsifiers are particularly used. From the environmental point of view, non-nonylphenyl type emulsifiers are used favorably. Optionally, two or more kinds of emulsifiers may be used in a combined form.

The amount of an emulsifier to be used is properly adjusted to suit the kind of emulsifier to be used and the kind of a monomer, for example. Generally, the amount of an emulsifier to be used is in the range of about 0.3 to about 10 parts by weight, preferably about 0.5 to about 5 parts by weight, based on 100 parts by weight of the total amount of monomers to be used for forming an acrylic copolymer.

As concrete examples of the protective colloid, polyvinyl alcohols such as partially saponified polyvinyl alcohol, wholly saponified polyvinyl alcohol, and modified polyvinyl alcohol; cellulose derivatives such as hydroxyethyl cellulose, hydroxypropyl cellulose, and carboxymethyl cellulose; and natural polysaccharides such as guar gum may be cited.

The protective colloids may be used singly or may be used in combination with an emulsifier. Though the amount of the protective colloid to be used depends on the condition, it is generally in the range of 0 to about 3 parts by weight based on 100 parts by weight of the total weight of the monomers to be used for forming an acrylic copolymer.

A polymerization initiator may be used for initiating emulsion polymerization. The polymerization initiator is not particularly restricted but is only required to be a substance which is decomposed by heat with generation of radical molecule. In the emulsion polymerization, a water-soluble initiator is advantageously used. The polymerization initiator includes persulfates such as potassium persulfate, ammonium persulfate, and sodium persulfate; water-soluble azo compounds such as 2,2'-azobis(2-amidinopropane)dihydrochloride and 4,4'-azobis(4-cyanopentanoic acid); thermally decomposing initiators such as hydrogen peroxide; and redox type polymerization initiators such as the combinations between hydrogen peroxide and ascorbic acid, t-butyl hydroperoxide and rongalite, potassium persulfate and a metal salt, and ammonium persulfate and sodium hydrogen sulfite, for example. The polymerization initiators are not limited thereto. The polymerization initiators may be used in the form of a mixture of two or more members.

The amount of a polymerization initiator to be used is not particularly restricted but may be properly set so as to suit the kind of a polymerization initiator to be used. For example, it is used preferably in the range of 0.1 to 2 parts by weight and more preferably 0.2 to 1 parts by weight based on 100 parts by weight of the total weight of all the monomers to be used.

In the emulsion polymerization, a reducing agent may be optionally used together. The reducing agents which are usable for this purpose include reducing organic compounds such as ascorbic acid, tartaric acid, citric acid, and glucose; and reducing inorganic compounds such as sodium thiosulfate, sodium sulfite, sodium hydrogen sulfite, sodium hydrogen metasulfite, for example.

Though the amount of a reducing agent to be used is not particularly restricted, it is generally in the range of about 0.05 to about 1 parts by weight based on 100 parts by weight of the total weight of monomers to be used for the formation of acrylic copolymer.

During the emulsion polymerization, a chain transfer agent may be used in an amount in the range of 0.001 to 2 parts by weight based on 100 parts by weight of the monomer in order to decrease the molecular weight. The chain transfer agent includes halogen-substituted alkanes such as carbon tetrachloride, bromoform, and bromotrichloroethane; alkyl mercaptans such as n-dodecyl mercaptan, tert-dodecyl mercaptan, octyl mercaptan, tetradecyl mercaptan, and hexadecyl mercaptan; thioesters of alkyl monothioglycol acid such as butyl thioglycolate, isooctyl thioglycolate, and dodecyl thioglycolate; alcohols such as methanol, ethanol, and isopropanol; and a-methyl styrene dimer, terpinol, terpinene, and dipentene, for example. The chain transfer agents are not limited thereto. The chain transfer agents may be used in the form of a mixture of two or more members.

The polymerization temperature in the emulsion polymerization is not particularly restricted. The polymerization temperature is preferably in the range of 0 to 100° C. and more preferably 40 to 95° C. The polymerization time is not particularly restricted. The polymerization time is generally in the range of 1 to 15 hours.

The core part and the shell part may be formed by a similar work. The additives and the conditions of work which are used therefor may be set respectively in some situations. In the emulsion polymerization for the formation of the shell part, for example, the addition of a surfactant and/or a protective colloid may be omitted.

The emulsion which is obtained after the reaction of emulsion polymerization is preferred to contain a nonvolatile component, namely core-shell type particles, in the range of not more than 60 mass %. If the nonvolatile component exceeds 60 mass %, the overage may possibly impart an unduly high viscosity to the emulsion and may possibly prevent the stability of dispersion from remaining intact and induce aggregation.

The pH of the emulsion is not particularly restricted. It is generally in the range of 2 to 10 and preferably 2 to 8. The pH value of the emulsion can be adjusted by adding aqueous ammonia, a water-soluble amine, or an aqueous alkali hydroxide solution to the emulsion.

The viscosity of the emulsion is generally in the approximate range of 10 to 10000 mPa.s and preferably 50 to 5000 mPa.s. This viscosity can be determined by the use of a Brookfield type rotational viscometer under such specific conditions as 25° C. and 20 rpm.

The emulsion for vibration damper of the first aspect, as shown in working examples, is combined with other components to form a composition for vibration damper such as, for example, a water-based coating composition for vibration damper. The other components which are incorporated in the composition for vibration damper include a solvent; a plasticizer; a stabilizer; a thickener; a wetting agent; an antiseptic agent; an antifoam agent; an inorganic filler; a coloring agent; a dispersing agent; a rust-proofing pigment; a defoaming agent; an anti-oxidant; a mildew proofing agent; an ultraviolet absorbent; and an antistatic agent, for example. Preferably, the composition for vibration damper contains at least the emulsion for vibration damper of the present invention and inorganic filler. That is, the composition for vibration damper of the present invention is a water-based composition for vibration damper which is obtained by mixing the emulsion for vibration damper of the present invention and inorganic filler. The emulsion for vibration damper, the inorganic filler, and other components which are optionally incorporated can be mixed by the use of a butterfly mixer, a planetary mixer, a spiral mixer, a kneader, or a dissolver, for example.

The components for the composition may be properly selected from the known materials. For example, the solvent includes ethylene glycol, butyl cellosolve, butyl carbitol, and butyl carbitol acetate. The thickener includes polyvinyl alcohol, cellulose derivatives, and polycarboxylic acid type resins, for example. The inorganic filler includes inorganic fillers such as calcium carbonate, kaolin, silica, talc, barium sulfate, alumina, iron oxide, titanium oxide, glass talc, magnesium carbonate, aluminum hydroxide, talc, diatomaceous earth, and clay; scaly inorganic fillers such as glass flakes and mica; and fibrous inorganic fillers such as metal-oxide whiskers and glass fibers, for example. The coloring agent includes organic and inorganic coloring agents such as titanium dioxide, carbon black, iron oxide red, Hanza yellow, benzene yellow, phthalocyanine blue, and quinacridon red, for example. The dispersing agent includes inorganic dispersing agents such as sodium hexametaphosphate and sodium tripolyphosphate and organic dispersing agents such as polycarboxylic acid type dispersing agent, for example. The rust-proofing pigment includes metal salts of phosphoric acid, metal salts of molybdic acid, and metal salts of boric acid, for example. The defoaming agent includes silicon type defoaming agents, for example.

The composition for vibration damper contains a solid component in an amount preferably in the range of about 40 to 90 mass %, more preferably about 50 to 85 mass %, and still more preferably about 60 to 80 mass %. The pH value of the composition for vibration damper is preferably in the range of 7 to 11 and more preferably 8 to 10.

The amounts of the components incorporated in the composition for vibration damper are not particularly restricted. The typical amounts is adapted with due respect to the characteristic properties to be obtained. The content of the emulsion for vibration damper, for example, is preferably in the amount of 20 to 50 parts by weight, more preferably 15 to 55 parts by weight and still more preferably 20 to 50 parts by weight as a solid content, based on 100 parts by weight of the solid content of the composition for vibration damper. The amount of the thickener to be incorporated is preferably in the range of 0.01 to 2 parts by weight, more preferably 0.05 to 1.5 parts by weight and still more preferably 0.1 to 1 parts by weight as a solid content, based on 100 parts by weight of the solid content of the composition for vibration damper. The amount of the inorganic filler to be incorporated is preferably in the range of 40 to 90 parts by weight, more preferably 45 to 85 parts by weight and still more preferably 50 to 80 parts by weight, based on 100 parts by weight of the solid content of the composition for vibration damper. The amounts are not limited to the ranges mentioned above.

The composition for vibration damper may contain a polyvalent metal compound. The polyvalent metal compound enhances the stability, dispersibility, and drying property of the composition for vibration damper and the vibration damping property of the vibration damper manufactured from the composition for vibration damper. The polyvalent metal compound is not particularly restricted. As concrete examples of the polyvalent metal compound, zinc oxide, zinc chloride, and zinc sulfate may be cited. The polyvalent metal compounds may be used in the form of a mixture of two or more members.

The form of the polyvalent metal compound is not particularly restricted. It may be a powder, an aqueous dispersion, or an emulsified dispersion, for example. In these forms, the aqueous dispersion or the emulsified dispersion is used preferably and the emulsified dispersion is used more preferably in respect that it results in enhancing the dispersibility into the composition for vibration damper. The amount of the polyvalent metal compound to be used is preferably in the range of 0.05 to 5.0 parts by weight and more preferably 0.05 to 3.5 parts by weight based on 100 parts by weight of the solid content in the composition for vibration damper.

The composition for vibration damper is required to be applied to a substrate and then dried for the purpose of forming a coating film which functions as a vibration damper. The substrate is not particularly restricted. For the sake of the application of the composition for vibration damper to the substrate, a brush, a spatula, an air spray, an airless spray, a mortar gun, and a lysine gun may be used.

The composition for vibration damper which is prepared by using the emulsion for vibration damper is applicable to an automobile interior floor, a railroad vehicle, a marine structure, aircraft, electrical machinery and apparatus, a structure, and constructional machinery and apparatus, for example. It is not limited thereto.

The amount of the composition for vibration damper to be applied is set, depending on the purpose of use and the performance aimed at. Specifically, the coating film in a dry state has a thickness preferably in the range of 0.5 to 5.0 mm and more preferably 1.5 to 4.5 mm. The coating film formed by the application of the composition for vibration damper which is prepared by using the emulsion of the present invention does not easily inflate or crack during the drying process. Even when the coating film is thickly applied, the thickness does not easily entail any problem.

When the aforementioned coating medium is applied and then dried to form a coating film, the drying may be effected by application of heat or by exposure to normal room temperature. From the viewpoint of efficiency, the drying by application of heat proves more favorable. The coating medium for vibration damper which is formed by using the composition for vibration damper of the present invention, even when it is dried by forced heating, does not easily inflate or crack because it possesses an excellent drying property. Thus, the coating medium proves particularly beneficial when the thermal drying is adopted. The temperature of the thermal drying is preferably in the range of 80 to 210° C. and more preferably 110 to 160° C.

Subsequently, the emulsion for vibration damper of the second aspect of the present invention will be described. The emulsion for vibration damper of the second aspect includes a particle formed of an acrylic copolymer (C) having a low glass transition point and a particle formed of an acrylic copolymer (D) having a high glass transition point.

As concrete examples of the acrylic copolymer (C) having a low glass transition point, copolymers having weight average molecular weights in the range of 20,000 to 250,000, preferably 40,000 to 220,000, and more preferably 60,000 to 200,000 may be cited. The glass transition points of these copolymers are in the range of −30 to 0° C. and preferably −25 to −5° C.

If the weight average molecular weight falls short of 20,000, the relevant copolymer may possibly manifest an unduly low vibration damping property. Conversely, if the weight average molecular weight exceeds 250,000, the relevant copolymer may possibly reveal deficiency in compatibility. The vibration damper produced by using the emulsion of the second aspect of the present invention is preferred to be a type which manifests a vibration damping property at temperature in the range of 10 to 70° C. The particles formed of the acrylic copolymer (C) are expected to manifest the vibration damping property at generally low temperature (10 to 40° C.). If the glass transition point falls short of −30° C., the shortage may possibly result in degrading the vibration damping property of the relevant acrylic copolymer. Conversely, if the glass transition point exceeds 0° C., the overage may possibly result in degrading the film forming property of the relevant acrylic copolymer.

As concrete examples of the acrylic copolymer (D) having a high glass transition point, copolymers having weight average molecular weights in the range of 20,000 to 250,000, preferably 40,000 to 220,000, and more preferably 60,000 to 200,000 may be cited. The glass transition points of these copolymers are in the range of 5 to 50° C., and preferably 10 to 40° C.

If the weight average molecular weight falls short of 20,000, the relevant copolymer may possibly reveal deficiency in vibration damping property. Conversely, if the weight average molecular weight exceeds 250,000, the relevant copolymer may possibly reveal deficiency in compatibility. The particles formed of the acrylic copolymer (D) are expected to manifest a vibration damping property generally at temperature in the range of 40 to 70° C. If the glass transition point falls short of 5° C., the shortage may possibly result in preventing the expected vibration damping property from being fully manifested at temperature in the range of 40 to 70° C. Conversely, if the glass transition point exceeds 50° C., the overage may possibly result in revealing deficiency in the expected film forming property.

The difference between the glass transition points of the copolymer (C) and the copolymer (D) is preferably in the range of 5 to 80° C. and more preferably 10 to 40° C. If the difference of glass transition point falls short of 5° C., the shortage may possibly result in disabling full coverage of the temperature range of 10 to 70° C. If the difference of glass transition point exceeds 80° C., the overage may possibly result in disabling full coverage of the temperature range of 10 to 70° C.

As regards the ratios of incorporation of the particles formed of the acrylic copolymer (C) and the particles formed of the acrylic copolymer (D), the ratio of incorporation of the particles formed of the copolymer (C) is in the range of 50 to 70 mass % and preferably 50 to 60 mass % and the ratio of incorporation of the particles formed of the copolymer (D) is in the range of 50 to 30 mass % and preferably 50 to 40 mass %, as reduced to a solid content in the emulsion. If the ratio of incorporation of the particles formed of the copolymer (C) falls short of 50 mass %, the shortage may possibly result in degrading the film forming property of the copolymer. Conversely, if the ratio of incorporation of the particles formed of the copolymer (C) exceeds 70 mass %, the overage may possibly result in disabling full coverage of the temperature range favorable for vibration damping property.

The copolymer (C) and the copolymer (D) used in the second aspect of the present invention are both copolymers for vibration damper which are each obtained by copolymerizing a monomer mixture having an acrylic monomer as an essential component.

The emulsion for vibration damper of the second aspect has a gel fraction measured with toluene solvent preferably in the range of 0 to 45 mass %. The coating film formed of the emulsion for vibration damper has a loss factor (tan δ) preferably of 0.15 or more. Now, the present invention will be described in detail below.

The copolymer (C) and the copolymer (D) used in the emulsion for vibration damper of the second aspect of the present invention are obtained by copolymerizing monomer mixtures each having an acrylic monomer as an essential component. The emulsion for vibration damper is a water-based emulsion having dispersed therein acrylic copolymers, which can be obtained by copolymerizing monomer mixture having water as a continuous phase and an acrylic monomer as an essential component. Generally, a vibration damper is formed by applying a composition for vibration damper which includes the emulsion for vibration damper as an essential component.

The emulsion for vibration damper according to the second aspect of the present invention can be prepared by mixing an emulsion containing a particle formed of a copolymer (C) and an emulsion containing a particle formed of a copolymer (D). The emulsion containing the particle formed of the copolymer (C) and the emulsion containing the particle formed of the copolymer (D) possess gel fraction preferably in the range of 0 to 45 mass % as measured with toluene solvent. The emulsion for vibration damper of the second aspect also has a gel fraction preferably in the range of 0 to 45 mass %. The term "gel fraction" as used herein is an index which indicates the solubility in a toluene solvent of a coating film formed of an emulsion. The gel fraction increases in proportion as the solubility in the toluene solvent decreases. The gel fraction reflects the molecular structure of a resin. If the gel fraction of the emulsion for vibration damper exceeds 45 mass %, the overage may possibly result in preventing the loss factor (tan δ) of the coating film formed of a composition for vibration damper from exceeding 0.15 and further may possibly result in increasing the dependency of the vibration damping property on temperature and appearing the peak of the vibration damping property to a specific temperature range. For the sake of enabling the coating film to manifest an excellent vibration damping property, the coating film is required to possess a gel fraction preferably in the range of 5 to 45 mass % and more preferably 5 to 30 mass %.

The gel fraction can be measured, for example, by the following method for measuring the toluene insoluble content.

(Method for Measuring Gel Fraction (Toluene Insoluble Content))

A given emulsion for vibration damper is cast in a retaining mold 0.2 cm in thickness on a release paper to produce a film 0.2 cm in thickness. This film is cut into sections each measuring 2 cm (length)×2 cm (width)×0.2 cm to obtain test film. The test film is immersed in 100 ml of toluene and the toluene is stirred at room temperature for 6 hours. The resultant solution is passed through a 100-mesh woven wire. The filtrate is measured for a solid content and the gel fraction is calculated from the solid content.

The coating film formed of the emulsion for vibration damper has a loss factor (tan δ) which is preferably not less than 0.15. When the composition for vibration damper is prepared by using the emulsion for vibration damper of the present invention, the coating film is formed of this composition for vibration damper, and this coating film is tested for loss factor (tan δ), the loss factor consequently found is preferably 0.15 or more. Incidentally, the vibration damping property or the loss factor is so correlated with the magnitude of tan δ of the coating film that the loss factor heightens and the vibration damping property gains in excellence in proportion as the magnitude of tan δ increases. If the loss factor (tan δ) falls short of 0.15, the shortage may possibly result in preventing the water-based vibration damper from manifesting a good vibration damping property. The loss factor is preferably not less than 0.16 and more preferably not less than 0.18.

The loss factor (tan δ) of the coating film which is formed of the emulsion for vibration damper is measured, for example, by a method which includes preparing a composition for vibration damper, forming a coating film (test piece) from the composition for vibration damper, and subjecting the coating film to the measurement as follows.

(Formulation of Composition for Vibration Damper)

100 parts by weight of an emulsion for vibration damper, 250 parts by weight of calcium carbonate (NN#200™ made by Nitto Funka Kogyo Co., Ltd.), 1 parts by weight of a dispersing agent (DEMOL™ EP made by Kao Co., Ltd.), 2 parts by weight of a thickener (Acryset™ AT-2 made by Nippon Shokubai Co., Ltd.), and 0.3 parts by weight of a defoaming agent (Nopuko™ 8034L made by San Nopuko Co., Ltd.)

(Method for Measuring Loss Factor (tan δ))

A given composition for vibration damper is cast in a retaining mold 3 mm in thickness on a cation-electrodeposited steel plate (15 mm in width×250 mm in length×0.8 mm in thickness) and drying the resultant sheet of composition at 150° C. for 30 minutes to produce a test piece. This test piece is tested for loss factor by the cantilever beam method using a loss factor measuring system made by Ono Sokki Co., Ltd. in an environment kept at 25° C.

The monomer mixture for forming an acrylic polymer includes an acrylic type monomer as an essential component. It is not particularly restricted but is only required to manifest the function and effect of the present invention. The term "acrylic type monomer" means (meth)acrylic acid derivatives such as (meth)acrylic acid and (meth)acrylic esters. The content of the acrylic type monomer in the monomer mixture is preferably 50 mass % or more based on the total weight of the monomer mixture. The content of a conjugate diene type monomer in the monomer mixture is preferably 10 mass % or less and more preferably 5 mass % or less based on the total weight of the monomer mixture from the viewpoint of the vibration damping property. Most preferably the monomer mixture contains no conjugate diene type monomer.

In the second aspect of the invention, the monomer mixture contains an unsaturated monomer with a functional group preferably in an amount of 10 mass % or less based on the total weight of the monomer mixture. The functional group in the functional group-containing unsaturated monomer is preferred to be capable of effecting cross-linking during the course of copolymerization. Owing to the action of this functional group, the emulsion for vibration damper is enabled to be improved in the film-forming property and the thermal drying property. More preferably, the monomer mixture contains the functional group-containing unsaturated monomer in an amount in the range of 0.1 to 3.0 mass %. The weight ratio mentioned above refers to weight proportion which are based on 100 mass % of the total monomer mixture.

As concrete examples of the functional group, epoxy group, oxazoline group, carbodiimide group, aziridinyl group, isocyanate group, methylol group, vinyl ether group, cyclocarbonate group, and alkoxysilane group may be cited. These functional groups may be present either singly or in the form of a combination of two or more member in one molecule of the unsaturated monomer.

As concrete examples of the functional group-containing unsaturated monomer, polyfunctionally unsaturated monomers such as divinyl benzene and ethylene glycol di(meth) acrylate; and glycidyl group-containing unsaturated monomers such as glycidyl(meth)acrylate and acryl glycidyl ether maybe cited. These unsaturated monomers may be used either singly or in the form of a mixture of two or more members in one molecule.

The monomer mixture is preferred to contain 0.1 to 20 mass % of an ethylenically unsaturated carboxylic acid monomer and 99.9 to 80 mass % of other copolymerizable ethylenically unsaturated monomer. In the composition for vibration damper which has an emulsion for vibration damper as an essential component, the inclusion of the ethylenically unsaturated carboxylic acid monomer results in enhancing the dispersibility of such a filler as an inorganic powder and improving the vibration damping property of the film to be formed. The inclusion of the other copolymerizable ethylenically unsaturated monomer results in facilitating the adjustment of the Tg and the physical properties of the emulsion for vibration damper. If the content of the ethylenically unsaturated carboxylic acid monomer in the monomer mixture falls short of 0.1 mass % or exceeds 20 mass %, the deviation may possibly result in preventing the copolymerization from proceeding stably during the course of the formation of the emulsion. Owing to the synergistic effect of the monomer units formed from such monomers, the present invention is enabled to have the thermal drying property and the vibration damping property fully manifested advantageously in the water-based vibration damper to be formed. The mass proportions mentioned above are such mass proportions as are based on 100 mass % of the total monomer mixture.

The ethylenically unsaturated carboxylic acid monomer is not particularly restricted. For example, unsaturated carboxylic acids and derivatives thereof such as (meth)acrylic acid, crotonic acid, itaconic acid, fumaric acid, maleic acid, monomethyl fumarate, monoethyl fumarate, monomethyl maleate, and monoethyl maleate may be used either singly or in the form of a combination of two or more members.

The other copolymerizable ethylenically unsaturated monomer is not particularly restricted. As concrete examples of the monomer, the aforementioned functional group-containing unsaturated monomers; (meth)acrylic esters such as methyl (meth)acrylate, ethyl(meth)acrylate, butyl (meth) acrylate, 2-ethylhexyl(meth)acrylate, and cyclohexyl (meth) acrylate; and aromatic unsaturated monomers such as styrene may be cited. These monomers may be used either singly or in the form of a combination of two or more members.

As a means to copolymerize the monomer mixture, the method of emulsion polymerization, for example, may be advantageously adopted. The mode of performing the emulsion polymerization is not particularly restricted. A method which includes properly adding a monomer mixture, a polymerization initiator, and a surfactant in an aqueous medium and subjecting them to copolymerization, for example, may be adopted. A polymerization chain transfer agent, for example, maybe used for the purpose of adjusting the molecular weight of the product.

The aqueous medium is not particularly restricted. As concrete examples of the aqueous medium, water, solvents soluble with water, mixed solvents resulting from combining two or more such solvents, and mixed solvents resulting from combining such solvents as main component with water may be cited. Among aqueous media enumerated above, water is used particularly favorably.

The polymerization initiator is not particularly restricted. As concrete examples of the polymerization initiator, such known water-soluble or oil-soluble initiators as ammonium persulfate, potassium persulfate, hydrogen peroxide, and butyl hydroperoxide may be cited. Such reducing agents as sodium hydrogen sulfite and L-ascorbic acid may be used as redox type initiators. They may be used either singly or in the form of a combination of two or more members.

The amount of the polymerization initiator to be used is not particularly restricted but may be properly fixed depending on the kind of polymerization initiator. For example, this amount is preferably in the range of 0.1 to 2 parts by weight and more preferably 0.2 to 1 parts by weight based on 100 parts by weight of the total monomer mixture.

The surfactant is not particularly restricted. Such emulsifiers as anionic emulsifiers, nonionic emulsifiers, and nonion-anionic emulsifiers may be used. Among emulsifiers enumerated above, nonionic emulsifiers and nonion-anionic emulsifiers are advantageously used from the viewpoint of the stability of emulsion polymerization. It is particularly advantageous to use a nonionic emulsifier and a non ion-anionic emulsifier in combination. As concrete examples of the anionic emulsifier, fatty acid soaps, resin acid soaps, alkyl sulfonic acid soaps, dialkylaryl sulfonates, alkyl sulfosuccinates, and polyoxyethylene alkyl sulfates may be cited. As concrete examples of the non ionic emulsifier, polyoxyethylene alkyl ethers, polyoxyethylene alkyl aryl ethers, polyoxyethylene sorbitan fatty acid esters, and oxyethylene oxypropylene block copolymers may be cited. These surfactants may be used either singly or in the form of a combination of two or more members.

The amount of the surfactant to be used is not particularly restricted but may be properly set, depending on the kind of emulsifier. This amount, for example, is preferably in the range of 0.05 to 5.0 parts by weight and more preferably 0.1 to 3.0 parts by weight based on 100 parts by weight of the total monomer mixture.

A polymerization chain transfer agent is properly used for the purpose of adjusting the weight average molecular weights of the acrylic copolymer (C) and the acrylic copolymer (D). The polymerization chain transfer agent is not particularly restricted. As concrete examples of the transfer agent, alkyl mercaptans such as hexyl mercaptan, octyl mercaptan, n-dodecyl mercaptan, t-dodecyl mercaptan, n-hexadecyl mercaptan, and n-tetradecyl mercaptan; halogenated hydrocarbons such as carbon tetrachloride, carbon tetrabromide, and ethylene bromide; mercapto-carboxylic alkyl esters such as mercaptoacetic acid 2-ethylhexyl ester, mercaptopropionic acid 2-ethylhexyl ester, and mercaptopropionic acid tridecyl ester; mercaptocarboxylic acid alkoxyalkyl esters such as mercaptoacetic acid methoxybutyl ester and mercaptopropionic acid methoxybutyl ester; carboxylic acid mercaptoalkyl esters such as octanoic acid 2-mercaptoethyl ester; and α-methyl styrene dimer, terpinolene, α-terpinene, γ-terpinene, dipentene, anisol, and allyl alcohol may be cited. These transfer agents may be used either singly or in the form of a combination of two or more members. Among other polymerization chain transfer agents enumerated above, alkyl mercaptans such as hexyl mercpatan, octyl mercaptan, n-dodecyl mercaptan, t-dodecyl mercpatan, n-hexadecylmercaptan, and n-tetradecylmercaptan are used particularly advantageously. The amount of the polymerization chain transfer agent to be used, for example, is generally in the range of 0 to 1 parts by weight and preferably 0 to 0.5 parts by weight based on 100 parts by total weight of the monomer mixture.

The emulsion polymerization may be optionally carried out in the presence of a chelating agent such as sodium ethylenediamine tetraacetate, a dispersing agent such as polysodium acrylate, and an inorganic salt. As a means to add the monomer mixture and the polymerization initiator, such methods as collective addition, continuous addition, and multistage addition may be adopted. These methods of addition may be adopted as properly combined.

The reaction conditions in the emulsion polymerization maybe properly set, depending on the composition of the monomer mixture and the kind of polymerization initiator to be used. The polymerization temperature, for example, is preferably in the range of 5 to 90° C. and more preferably 20 to 85° C. The polymerization time, for example, is preferably in the range of 3 to 8 hours. The polymerization and the dropwise addition are preferably carried out while the system is kept stirred.

The emulsion for vibration damper of the second aspect of the present invention can form a composition for vibration damper optionally in combination with an additive and a solvent. The composition for vibration damper which essentially contains the emulsion for vibration damper of the second aspect of the present invention is one preferred embodiment of the present invention. It can manifest a thermally drying property and a vibration damping property advantageously during the formation of a water-based vibration damper.

The amount of the emulsion for vibration damper to be incorporated in the composition for vibration damper, for example, is preferably such that the solid content of the emulsion for vibration damper may fall in the range of 13 to 40 mass % based on 100 mass % of the solid content of the composition for vibration damper.

As concrete examples of the additive, a filler, a coloring agent, an antiseptic agent, a dispersing agent, a thickener, a thixotropic agent, an antifreezing agent, a pH adjusting agent, a defoaming agent, a wetting agent, a rust-proofing agent, and an adhesiveness-imparting agent may be cited. Theses additives may be used either singly or in the form of a combination of two or more members. Among other additives enumerated above, the filler is incorporated particularly advantageously.

The filler is not particularly discriminated. As concrete examples of the filler, inorganic fillers such as calcium carbonate, kaolin, silica, talc, barium sulfate, alumina, iron oxide, titanium oxide, and glass talc; scaly inorganic fillers such as glass flakes and mica; and fibrous inorganic fillers such as metal oxide whiskers and glass fibers may be cited.

The amount of the filler to be used in the composition for vibration damper, for example, is preferably in the range of 50 to 700 parts by weight and more preferably 100 to 550 parts by weight based on 100 parts by weight of the solid content of the emulsion for vibration damper.

The solvent is not particularly restricted but is only required to manifest the function and the effect aimed at by the present invention. The known solvents may be used either singly or in the form of a combination of two or more members. The amount of the solvent to be incorporated may be properly set so that the solid content of the composition for vibration damper may fall in the range mentioned above.

The composition for vibration damper is required, for example, to be applied to a substrate and then dried, in order to form a coating film which serves as a vibration damper. As concrete examples of the means to apply the composition for vibration damper to the substrate, a brush, a spatula, an air spray, an airless spray, a mortar gun, and a lysine gun may be cited.

As the condition for forming a coating film by applying the composition for vibration damper and drying the applied layer of the composition, for example, the drying by use of heat and the drying by exposure to a normal room temperature may be used. The drying by use of heat proves advantageous from the viewpoint of efficiency. The use of the emulsion for vibration damper of the present invention results in imparting an excellent thermal drying property to the coating film. The temperature of the thermal drying, for example, is preferably in the range of 110 to 180° C. and more preferably 120 to 170° C.

The usage for the composition for vibration damper which includes the emulsion for vibration damper of the second aspect as an essential component is not particularly restricted. Since the composition is capable of manifesting a thermal drying property and a vibration damping property excellently, it can be applied advantageously to a railroad vehicle, a marine structure, aircraft, electrical machinery and apparatus, an architectural structure, and constructional machinery and apparatus besides an automobile interior floor.

EXAMPLES

The effects of the present invention will be described below with reference to working examples and comparative examples. Wherever "%" and "parts" are mentioned in the following examples, they respectively mean "mass %" and "parts by weight" unless otherwise specified.

Example 1

A polymerization vessel furnished with a stirrer, a reflux condenser, a thermometer, a nitrogen inlet tube, and a dropping funnel was charged with deionized water (170.5 parts). Then, the water was stirred as swept with a stream of nitrogen gas and the interior temperature of the vessel was elevated to 70° C. Meanwhile, the dropping funnel was charged with a monomer emulsion 1 which was composed of methyl methacrylate (25 parts), styrene (111.5 parts), 2-ethylhexyl acrylate (108.5 parts), acrylic acid (2.5 parts), glycidyl methacrylate (2.5 parts), a sulfuric ester of polyoxyethylene alkyl ether prepared in advance to an aqueous 20% solution (HITENOL™ N-08 sold by Dai-ichi Kogyo Seiyaku Co., Ltd.; 37.5 parts), and deionized water (57.5 parts).

The reaction in the polymerization vessel was initiated by adding dropwise the monomer emulsion 1 into the polymerization vessel adjusted to 70° C. The inner temperature of the vessel was elevated to 75° C. and then retained at 75° C. while the monomer emulsion 1 was uniformly added dropwise into the polymerization vessel over a period of two hours. At the same time, an aqueous 5% potassium persulfate solution (27 parts) and an aqueous 2% sodium hydrogen sulfite solution (20 parts) were uniformly added thereto dropwise over a period of two hours. In consequence of these dropwise additions, an emulsion for core parts was formed. After completion of the dropwise addition, the reaction was continued at 75° C. for one hour so as to complete consumption of the monomers.

Subsequently, in another dropping funnel, a monomer emulsion 2 composed of methyl methacrylate (50 parts), styrene (126 parts), 2-ethylhexyl acrylate (69 parts), acrylic acid (2.5 parts), glycidyl methacrylate (2.5 parts), a sulfuric ester of polyoxyethylene alkyl ether adjusted in advance to an aqueous 20% solution (HITENOL™ N-08 sold by Dai-ichi Kogyo Seiyaku Co., Ltd.; 37.5 parts), and deionized water (57.5 parts) was prepared.

The reaction was initiated by adding the prepared monomer emulsion 2 dropwise to the emulsion for the core part. The inner temperature was retained at 75° C. and the monomer emulsion 2 was added dropwise over a period of two hours. At the same time, an aqueous 5% potassium persulfate solution (27 parts) and an aqueous 2% sodium hydrogen sulfite solution (20 parts) were uniformly added dropwise over a period of two hours. In consequence of the dropwise additions, the shell part was formed and the core-shell type particles were obtained. After the completion of the dropwise addition, the reaction was continued at 75° C. for one hour so as to complete consumption of the monomers. Thereafter, the reaction solution was cooled to 25° C., and mixed with a proper amount of a 25% aqueous ammonia to obtain a water-based emulsion for vibration damper. The resultant emulsion for vibration damper had a nonvolatile content of 55.1%, a pH of 8.8, and a viscosity of 500 mPa.s.

For the sake of reference, the formulations of the monomer compositions used herein are shown in Table 1 and Table 2. The specifications of the formed emulsions for vibration damper are shown in Table 3. In Table 1 and Table 2, MMA stands for methyl methacrylate, St for styrene, 2-EHA for 2-ethylhexyl acrylate, AA for acrylic acid, and GAA for glycidyl methacrylate respectively. The term "total Tg" refers to the glass transition point of the whole core-shell type particles. $M_{(c)}:M_{(s)}$ represents the mass ratio of the mass $M_{(c)}$ of the core part and the mass $M_{(s)}$ of the shell part.

Examples 2 to 9

Emulsions for vibration damper which contain core-shell type particles were obtained by following the procedure of Example 1 while changing the formulations of the monomer compositions used for the formation of the core part and the shell part therein to those shown in Table 1. The specifications of the formed emulsions for vibration dampers were as shown in Table 3.

Comparative Example 1

A polymerization vessel furnished with a stirrer, a reflux condenser, a thermometer, a nitrogen inlet tube, and a dropping funnel was charged with deionized water (170.5 parts). Then, the water was stirred as swept with a stream of nitrogen gas and the interior temperature of the vessel was elevated to 70° C. Meanwhile, the dropping funnel was charged with a monomer emulsion 3 which was composed of methyl methacrylate (75 parts), styrene (239 parts), 2-ethylhexyl acrylate (176 parts), acrylic acid (5 parts), glycidyl methacrylate (5 parts), a sulfuric ester of polyoxyethylene alkyl ether prepared in advance to an aqueous 20% solution (HITENOL™ N-08 sold by Dai-ichi Kogyo Seiyaku Co., Ltd.; 37.5 parts), and deionized water (115 parts).

The reaction in the polymerization vessel was initiated by adding dropwise the monomer emulsion 3 into the polymerization vessel adjusted to 70° C. The inner temperature of the vessel was elevated to 75° C. and then retained at 75° C. while the monomer emulsion 3 was uniformly added dropwise into the polymerization vessel over a period of three hours. At the same time, an aqueous 5% potassium persulfate solution (54 parts) and an aqueous 2% sodium hydrogen sulfite solution (40 parts) were uniformly added thereto dropwise over a period of three hours. In consequence of these dropwise additions, acrylic copolymer particles having a glass transition point of 15° C. were formed. Thereafter, the reaction solution was cooled to 25° C. The cooled reaction solution was mixed with a proper amount of 25% aqueous ammonia to obtain a water-based emulsion for vibration damper. The produced emulsion for vibration damper had a nonvolatile content of 54.9%, a pH of 8.9, and a viscosity of 450 mPa.s. For the sake of reference, the formulations of the monomer compositions used herein are shown in Table 2. The specifications of the formed emulsion for vibration damper are shown in Table 3.

Comparative Examples 2 and 3

Emulsions for vibration damper, which contain particles, were obtained by following the procedure of Comparative Example 1 while changing the formulations of the monomer compositions to those shown in Table 2. The specifications of the formed emulsions for vibration damper were as shown in Table 3.

Comparative Examples 4 to 6

Emulsions for vibration damper, which contain core-shell type particles, were obtained by following the procedure of Example 1 while changing the formulations of the monomer compositions used for the formation of the core part and the shell part to those shown in Table 2. The specifications of the formed emulsions for vibration damper were as shown in Table 3.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Core part | MMA | 25 | 25 | 15 | 15 | 5 | 5 | 5 | 50 | 60 |
| | St | 111.5 | 102 | 80 | 88 | 63 | 46.5 | 31 | 126 | 106 |
| | 2-EHA | 108.5 | 114 | 101 | 93 | 79 | 95.5 | 111 | 69 | 128 |
| | AA | 2.5 | 2.5 | 2 | 2 | 1.5 | 1.5 | 1.5 | 2.5 | 3 |
| | GAA | 2.5 | 2.5 | 2 | 2 | 1.5 | 1.5 | 1.5 | 2.5 | 3 |
| | Tg(° C.) | 0 | −6 | −11 | −5 | −14.5 | −30 | −43 | 30 | 15 |
| Shell part | MMA | 50 | 50 | 60 | 60 | 70 | 70 | 70 | 25 | 58 |
| | St | 126 | 138 | 136 | 151 | 176 | 192.5 | 208 | 111.5 | 98 |
| | 2-EHA | 69 | 57.5 | 98 | 83 | 97 | 80.5 | 65 | 108.5 | 40 |
| | AA | 2.5 | 2.5 | 3 | 3 | 3.5 | 3.5 | 3.5 | 2.5 | 2 |
| | GAA | 2.5 | 2.5 | 3 | 3 | 3.5 | 3.5 | 3.5 | 2.5 | 2 |
| | Tg(° C.) | 30 | 40 | 20 | 30 | 30 | 40 | 50 | 0 | −8.4 |
| | Total Tg(° C.) | 15 | 15 | 6.7 | 15 | 15 | 15 | 15 | 15 | 5 |
| | $M_{(C)}:M_{(S)}$ | 5:5 | 5:5 | 4:6 | 4:6 | 3:7 | 3:7 | 3:7 | 5:5 | 6:4 |

TABLE 2

| | | Comparative Examples | | | | | |
|---|---|---|---|---|---|---|---|
| | | 1 | 2 | 3 | 4 | 5 | 6 |
| Core part | MMA | 75 | 75 | 75 | 60 | 50 | 50 |
| | St | 239 | 277 | 197 | 163 | 118 | 95 |
| | 2-EHA | 176 | 138 | 219 | 71 | 77 | 100 |
| | AA | 5 | 5 | 5 | 3 | 2.5 | 2.5 |
| | GAA | 5 | 5 | 5 | 3 | 2.5 | 2.5 |
| | Tg(° C.) | 15 | 30 | 0 | 38.5 | 23.2 | 6.5 |
| Shell part | MMA | — | — | — | 40 | 50 | 50 |
| | St | — | — | — | 50 | 95 | 118 |
| | 2-EHA | — | — | — | 106 | 100 | 77 |
| | AA | — | — | — | 2 | 2.5 | 2.5 |
| | GAA | — | — | — | 2 | 2.5 | 2.5 |
| | Tg(° C.) | — | — | — | −15 | 6.5 | 23.2 |
| | Total Tg(° C.) | 15 | 30 | 0 | 15 | 15 | 15 |
| | $M_{(C)}:M_{(S)}$ | — | — | — | 6:4 | 5:5 | 5:5 |

TABLE 3

| | Solid content (%) | pH | Viscosity (mPa·s) |
|---|---|---|---|
| Example 1 | 55.1 | 8.8 | 500 |
| Example 1 | 54.9 | 8.7 | 480 |
| Example 3 | 54.9 | 8.7 | 400 |
| Example 4 | 54.8 | 8.8 | 420 |
| Example 5 | 55.0 | 8.9 | 530 |
| Example 6 | 55.0 | 8.9 | 300 |
| Example 7 | 54.9 | 8.8 | 250 |
| Example 8 | 54.9 | 8.9 | 390 |
| Example 9 | 55.0 | 8.9 | 420 |
| Comparative Examples 1 | 54.9 | 8.9 | 450 |
| Comparative Examples 2 | 55.3 | 8.4 | 420 |
| Comparative Examples 3 | 54.9 | 8.9 | 630 |
| Comparative Examples 4 | 54.9 | 8.6 | 610 |
| Comparative Examples 5 | 54.8 | 8.8 | 380 |
| Comparative Examples 6 | 55.0 | 8.9 | 340 |

Water-based coating compositions for vibration damper were obtained by formulating the water-based emulsions of Examples 1 to 9 and Comparative Examples 1 to 6 for vibration damper as shown below.

Water-based emulsion for vibration damper 100 parts
Inorganic filler (calcium carbonate, NN#200 made by Nitto Funka Kogyo Co., Ltd.) 250 parts
Dispersing agent (DEMOL™ EP made by Kao Co., Ltd.) 1 part Thickener (Acryset™ AT-2 made by Nippon Shokubai Co., Ltd.) 2 parts Deforming agent (Nopuko™ 8034L made by San Nopuko Co., Ltd.) 0.3 parts This composition for vibration damper was tested for thermal drying property and loss factor.

(Thermal Drying Property)

On a cation-electrodeposited plate, produced compositions for vibration damper were applied in three dry film thicknesses of 1.5 mm, 3.0 mm, and 4.5 mm. The applied layers thus formed were then dried with a hot air drier at 150° C. for 30 minutes. The dried coating films were rated for inflating and cracking conditions on the following scale.

Standard for Rating (Visual Observation)

○: No discernible sign of occurrence of inflating and cracking conditions

Δ: Discernible sign of slight occurrence of inflating and cracking conditions x: Discernible sign of occurrence of numerous inflating and cracking conditions (Method for Measurement of Loss Factor)

A produced composition for vibration damper was cast into a retaining mold 4 mm in thickness on a cold rolled steel plate (15 mm in width×250 mm in length×0.8 mm in thickness; SPCC-SD made by Nippon Testpanel Co., Ltd.) and then dried at 150° C. for 30 minutes to form a coating film for vibration damper on the cold rolled steel plate. The coating film for vibration damper thus obtained was tested for vibration damping property by means of loss factor. The loss factor was evaluated by measuring the magnitudes of tan δ at 25° C. and 40° C. by the resonance method (3 dB method) using a cantilever beam system (loss factor measuring system made by Ono Sokki Co., Ltd.). The excellence of the vibration damping property increased in proportion as the magnitude of loss factor increased.

TABLE 4

|  | Thermal drying property | | | Loss factor | |
| --- | --- | --- | --- | --- | --- |
|  | 1.5 mm | 3.0 mm | 4.5 mm | 25° C. | 40° C. |
| Example 1 | ○ | Δ | Δ | 0.06 | 0.32 |
| Example 2 | ○ | Δ | Δ | 0.06 | 0.32 |
| Example 3 | ○ | Δ | Δ | 0.15 | 0.20 |
| Example 4 | ○ | ○ | Δ | 0.08 | 0.31 |
| Example 5 | ○ | ○ | ○ | 0.11 | 0.31 |
| Example 6 | ○ | ○ | ○ | 0.15 | 0.30 |
| Example 7 | ○ | ○ | ○ | 0.14 | 0.33 |
| Example 8 | ○ | ○ | Δ | 0.07 | 0.30 |
| Example 9 | ○ | Δ | Δ | 0.16 | 0.19 |
| Comparative Examples 1 | ○ | Δ | x | 0.08 | 0.30 |
| Comparative Examples 2 | ○ | x | x | 0.04 | 0.20 |
| Comparative Examples 3 | Δ | x | x | 0.30 | 0.06 |
| Comparative Examples 4 | ○ | Δ | x | 0.11 | 0.31 |
| Comparative Examples 5 | ○ | Δ | x | 0.09 | 0.28 |
| Comparative Examples 6 | ○ | Δ | x | 0.08 | 0.29 |

As shown in Table 4, the coating films formed by using the emulsions for vibration damper of the present invention excelled in drying property and precluded occurrence of a crack or an inflation during the course of drying. They were demonstrated to function as vibration dampers over a wide range of temperature.

Examples 10 to 13 and Comparative Examples 7 to 10

A polymerization vessel furnished with a stirrer, a reflux condenser, a thermometer, a nitrogen inlet tube, and a dropping funnel was charged with deionized water (540 parts). Then, the water was stirred as swept with a stream of nitrogen gas and the interior temperature of the vessel was elevated to 70° C. Meanwhile, the dropping funnel was charged with a monomer emulsion which was composed of styrene (164 parts), methyl methacrylate (160 parts), butyl acrylate (468.2 parts), acrylic acid (8.0 parts), t-dodecyl mercaptan (3.2 parts), a sulfuric ester of polyoxyethylene alkyl ether prepared in advance to an aqueous 20% solution (HITENOL™ N-08 sold by Dai-ichi Kogyo Seiyaku Co., Ltd.; 37.5 parts), and deionized water (14.4 parts).

The reaction in the polymerization vessel was initiated by adding dropwise the monomer emulsion into the polymerization vessel adjusted to 70° C. The inner temperature of the vessel was elevated to 75° C. and then retained at 75° C. while the monomer emulsion was uniformly added dropwise into the polymerization vessel over a period of three hours. At the same time, an aqueous 5% potassium persulfate solution (32 parts) and an aqueous 2% sodium hydrogen sulfite solution (40 parts) were uniformly added thereto dropwise over a period of three hours. Consequently, an emulsion containing polymer particles having a Tg of −10° C. was obtained. After completion of the dropwise addition, the reaction was continued at 75° C. for one hour so as to complete consumption of the monomers. The reaction solution was cooled to 25° C. and the cooled reaction solution was mixed with a proper amount of 25% aqueous ammonia to obtain an emulsion sample 1. The produced emulsion had a nonvolatile content of 50.0%, a pH of 7.8, and a viscosity of 200 mPa.s.

(Preparation of Emulsion Samples 2–9)

Emulsion samples 2–9 were manufactured by following the procedure used for the sample 1 while chanting the formulations of the monomer compositions. The relevant compositions used in the polymerization were shown in Tables 5 and 6. When classified by glass transition point, the emulsion samples 1–5 corresponded to the emulsions containing particles formed of an acrylic copolymer (C) and the emulsion samples 6–9 corresponded to the emulsions containing particles of an acrylic copolymer (D). The weight average molecular weights of the acrylic copolymers were determined by the following procedure.

[Measurement of Molecular Weight]

--Preparation of Sample--

A given emulsion was so dissolved in THF (tetrahydrofuran) as to set the emulsion solid content at about 0.2% and the resultant solution was passed through a filter to obtain a sample for the measurement.

--Measuring Instrument--

Instrument proper: Made by Shimadzu Corporation (HLC-8120GPC)

Column: G5000HXL+GMHXL-L

The emulsion sample 5 was not dissolved in the THF and could not be tested for molecular weight but was at least inferred to have a higher molecular weight than the emulsion sample 4.

TABLE 5

| Sample No. | 1 | 2 | 3 | 4 | 5 |
| --- | --- | --- | --- | --- | --- |
| Weight average molecular weight (MW) | 74,000 | 56,000 | 130,000 | 252,000 | insoluble in THF |

TABLE 5-continued

| Sample No. | 1 | 2 | 3 | 4 | 5 |
|---|---|---|---|---|---|
| Glass transition point (Tg) (° C.) | −10 | −10 | −10 | −10 | −10 |
| MMA | 20 | 25 | 30 | 20 | 30 |
| St | 20.5 | 23.7 | 18.6 | 20.5 | 18.6 |
| 2EHA |  | 50.3 | 50.4 |  | 50.4 |
| BA | 58.5 |  |  | 58.5 |  |
| AA | 1.0 | 1.0 | 1.0 | 1.0 | 1.0 |
| t-DM | 0.4 | 0.4 | 0.2 | 0.1 | 0.0 |

Note)
THF: Tetrahydrofuran
MMA: Methyl methacrylate
St: Styrene:
2EHA: 2-Ethylhexyl acrylate
BA: Butyl acrylate
AA: Acrylic acid
t-DM: t-Dodecyl mercaptan The same symbols apply to the following table.

TABLE 6

| Sample No. | 6 | 7 | 8 | 9 |
|---|---|---|---|---|
| Weight average molecular weight (MW) | 130,000 | 89,000 | 44,000 | 250,000 |
| Glass transition point (Tg) (° C.) | 20 | 20 | 20 | 20 |
| MMA | 25 | 20 | 30 | 25 |
| St | 41.0 | 40.7 | 30.5 | 35.6 |
| 2EHA | 33.0 |  |  |  |
| BA |  | 38.3 | 38.5 | 38.4 |
| AA | 1.0 | 1.0 | 1.0 | 1.0 |
| t-DM | 0.2 | 0.4 | 0.8 | 0.1 |

Compositions for vibration damper were obtained by formulating the emulsion samples 1 to 9 as shown in Table 7 and Table 8. The amounts of the other components incorporated in the compositions for vibration damper were as shown below.

| Acrylic copolymer emulsion | 100 parts |
|---|---|
| Calcium carbonate NN#200*[1] | 250 parts |
| Dispersing agent, Demooru EP*[2] | 1 part |
| Thickener, Acryset AT-2*[3] | 2 parts |
| Deforming agent, Nopuko 8034L*[4] | 0.3 part |

*[1]Filler made by Nitto Funka Kogyo Co., Ltd.
*[2]Special polycarboxylic acid type high polymer surfactant, made by Kao Co., Ltd.
*[3]Alkali-soluble acrylic type thickener, made by Nippon Shokubai Co., Ltd.
*[4]Deforming agent (main components: hydrophobic silicone + mineral oil) made by San Nopuko Co., Ltd.

The resultant compositions for vibration damper were subjected to the following rating. The results were as shown in Tables 7 and 8.

(Test for Film Forming Property)

A given composition for vibration damper was cast in a retaining mold 2 mm in thickness on a cold rolled steel plate (SPCC, 70 mm in width×150 mm in length×0.8 mm in thickness), left standing at two different temperature (10° C. and 20° C.), and visually examined as to peeling and cracking conditions.

○: No defect detected.

Δ: Discernible sign of slight peeling and cracking conditions x: Discernible sign of numerous peeling and cracking conditions (Measurement of Loss Factor)

A given composition for vibration damper was cast in a retaining mold 4 mm in thickness on a cold rolled steel plate (SPCC, 10 mm in width×245 mm in length×1.6 mm in thickness) and dried at 150° C. for 30 minutes to form a coating film for vibration damper on the cold rolled steel plate. The vibration damping property was evaluated by measuring the loss factor at 20 to 60° C. by the resonance method (3 dB method) using a cantilever beam system (loss factor measuring system made by Ono Sokki Co., Ltd.).

TABLE 7

|  |  | Examples | | | |
|---|---|---|---|---|---|
| Sample No. |  | 1 | 2 | 3 | 4 |
| A component polymer | MW74,000*[1] | 50 g |  |  | 60 g |
|  | MW56,000*[2] |  | 50 g |  |  |
|  | MW130,000*[3] |  |  | 50 g |  |
|  | MW252,000*[4] insoluble in THF*[5] |  |  |  |  |
| B component polymer | MW130,000*[6] |  |  | 50 g |  |
|  | MW89,000*[7] | 50 g |  |  | 40 g |
|  | MW44,000*[8] |  | 50 g |  |  |
|  | MW250,000*[9] |  |  |  |  |
| Film forming property | 10° C. | ○ | ○ | ○ | ○ |
|  | 20° C. | ○ | ○ | ○ | ○ |
| Loss factor | 20° C. | 0.091 | 0.092 | 0.089 | 0.111 |
|  | 30° C. | 0.113 | 0.115 | 0.101 | 0.123 |
|  | 40° C. | 0.139 | 0.143 | 0.137 | 0.139 |
|  | 50° C. | 0.108 | 0.111 | 0.114 | 0.099 |
|  | 60° C. | 0.090 | 0.094 | 0.089 | 0.084 |

TABLE 8

|  |  | Comparative Examples | | | |
|---|---|---|---|---|---|
| Sample No. |  | 1 | 2 | 3 | 4 |
| A component polymer | MW74,000*[1] |  |  |  |  |
|  | MW56,000*[2] |  | 100 g |  |  |
|  | MW130,000*[3] |  |  |  |  |
|  | MW252,000*[4] |  |  |  | 50 g |
|  | insoluble in THF*[5] |  | 50 g |  |  |
| B component polymer | MW130,000*[6] |  |  |  |  |
|  | MW89,000*[7] |  |  |  |  |
|  | MW44,000*[8] |  |  |  |  |
|  | MW250,000*[9] | 100 g | 50 g |  | 50 g |
| Film forming property | 10° C. | x | x | ○ | x |
|  | 20° C. | x | ○ | ○ | ○ |
| Loss factor | 20° C. | 0.009 | 0.062 | 0.089 | 0.063 |
|  | 30° C. | 0.021 | 0.071 | 0.111 | 0.070 |
|  | 40° C. | 0.060 | 0.095 | 0.059 | 0.099 |
|  | 50° C. | 0.123 | 0.065 | 0.028 | 0.061 |
|  | 60° C. | 0.091 | 0.052 | 0.015 | 0.049 |

The entire disclosure of Japanese Patent Application No. 2003-340359filed on Sep. 30, 2003 and No. 2004-099305 filed on Mar. 30, 2004 including specification, claims, drawings, and summary are incorporated herein by reference in its entirety.

What is claimed is:

1. A water-based emulsion for vibration damper, comprising:
   particles formed of an acrylic copolymer (C) having a weight average molecular weight in the range of 20,000 to 130,000 and a glass transition point in the range of −30 to 0° C., and
   particles formed of an acrylic copolymer (D) having a weight average molecular weight in the range of 20,000 to 130,000 and a glass transition point in the range of 5 to 50° C.,
   the ratio of the particles formed of the acrylic copolymer (C) being in the range of 50 to 70 mass % based on the solid component contained in the emulsion, and
   the ratio of the particles of the acrylic copolymer (D) being in the range of 50 to 30 mass % based on the solid component contained in the emulsion.

2. A water-based emulsion according to claim 1, wherein the weight average molecular weight of the acrylic copolymer (C) is in the range of 40,000 to 130,000, the glass transition point of the acrylic copolymer (C) is in the range of −25 to −5° C., the weight average molecular weight of the acrylic copolymer (D) is in the range of 40,000 to 130,000, and the glass transition point of the acrylic copolymer (D) is in the range of 10 to 40° C.

3. A water-based emulsion according to claim 1, wherein the difference between the glass transition point of the acrylic copolymer (C) and the glass transition point of the acrylic copolymer (D) is in the range of 5 to 80° C.

4. A water-based emulsion according to claim 2, wherein the ratio of the particles formed of the acrylic copolymer (C) is in the range of 50 to 60 mass % on the solid component contained in the emulsion and the ratio of the particles formed of the acrylic copolymer (D) is in the range of 50 to 40 mass %.

5. A water-based emulsion according to claim 1, wherein a gel fraction of the emulsion is in the range of 0 to 45 mass %.

6. A water-based emulsion according to claim 1, wherein a gel fraction of the emulsion is in the range of 5 to 45 mass %.

7. A water-based emulsion according to claim 1, wherein each of acrylic polymers (C) and (D) are formed by copolymerizing a monomer mixture containing 50 mass % or more of an acrylic type monomer.

8. A water-based emulsion according to claim 7, wherein the monomer mixture contains an unsaturated monomer with a functional group in an amount of 10 mass % or less.

9. A water-based emulsion according to claim 8, wherein the monomer mixture contains the functional group-containing unsaturated monomer in an amount in the range of 0.1 to 3.0 mass %.

10. A water-based emulsion according to claim 7, wherein said acrylic type monomer is at least one member selected from the group consisting of (meth)acrylic acid and (meth)acrylic acid ester.

11. A water-based emulsion according to claim 9, wherein said functional group is at least one member selected from the group consisting of epoxy group, oxazoline group, carbodiimide group, aziridinyl group, isocyanate group, methylol group, vinyl ether group, cyclocarbonate group, and alkoxysilane group.

12. A water-based composition for vibration damper which comprises a water-based emulsion for vibration damper comprising:
   particles formed of an acrylic copolymer (C) having a weight average molecular weight in the range of 20,000 to 130,000 and a glass transition point in the range of −30 to 0° C., and
   particles formed of an acrylic copolymer (D) having a weight average molecular weight in the range of 20,000 to 130,000 and a glass transition point in the range of 5 to 50° C.,
   the ratio of the particles formed of the acrylic copolymer (C) being in the range of 50 to 70 mass % based on the solid component contained in the emulsion,
   the ratio of the particles of the acrylic copolymer (D) being in the range of 50 to 30 mass % based on the solid component contained in the emulsion,
   a difference between the glass transition points of the copolymer (C) and the copolymer (D) being in the range of 5 to 80° C., and
   a loss factor (tan δ) being not less than 0.15, and
   an inorganic filler.

13. A water-based composition according to claim 12, wherein
   the weight average molecular weight of the acrylic copolymer (C) is in the range of 40,000 to 130,000 the glass transition point of the acrylic copolymer (C) is in the range of −25 to −50° C., the weight average molecular weight of the acrylic copolymer (D) is in the range of 40,000 to 130,000, and the glass transition point of the acrylic copolymer (D) is in the range of 10 to 40° C.,
   the difference between the glass transition points of the copolymer (C) and the copolymer (D) is in the range of 10 to 40° C., and the loss factor (tan δ) is not lower than 0.16.

14. A water-based composition according to claim 12, wherein a solid content is in the range of 40 to 90 mass %.

15. A water-based composition according to claim 12, wherein an amount of the emulsion for vibration damper is in the range of 13–40 mass % based on 100 mass % of the composition.

16. A water-based composition according to claim 12, wherein the ratio of the particles formed of the acrylic copolymer (C) is in the range of 50 to 60 mass % on the solid component contained in the emulsion and the ratio of the particles formed of the acrylic copolymer (D) is in the range of 50 to 40 mass %.

17. A water-based composition according to claim 12, wherein a gel fraction of the emulsion is in the range of 0 to 45 mass %.

18. A water-based composition according to claim 12, wherein the gel fraction of the emulsion is in the range of 5 to 45 mass %.

19. A water-based composition according to claim 12, wherein each of acrylic polymers (C) and (D) are formed by copolymerizing a monomer mixture containing 50 mass % or more of an acrylic type monomer.

20. A water-based composition according to claim 19, wherein a monomer mixture contains an unsaturated monomer with a functional group in an amount of 10 mass % or less.

21. A water-based composition according to claim 20, wherein the monomer mixture contains the functional group-containing unsaturated monomer in an amount in the range of 0.1 to 3.0 mass %.

22. A water-based composition according to claim 19, wherein said acrylic type monomer is at least one member selected from consisting of (meth)acrylic acid and (meth)acrylic acid ester.

23. A water-based composition according to claim 21, wherein said functional group is at least one member selected from the group consisting of epoxy group, oxazoline group, carbodiimide group, aziridinyl group, isocyanate group, methylol group, vinyl ether group, cyclocarbonate group, and alkoxysilane group.

* * * * *